May 21, 1929.  J. L. KRIEG  1,713,835

UNIVERSAL HOOK

Filed July 18, 1928

Inventor
Jack L. Krieg
Louis C. Vanderlip.
Attorney

Patented May 21, 1929.

1,713,835

UNITED STATES PATENT OFFICE.

JACK L. KRIEG, OF SOUTH BEND, INDIANA.

UNIVERSAL HOOK.

Application filed July 18, 1928. Serial No. 293,610.

This invention relates to swivel or universally mounted supporting elements, and particularly to universal hooks.

The particular object of my invention is to provide an improved universal hook having a lubricant chamber or container therein to render the hook noiseless when in use.

Another object of the invention is to provide an improved and lubricated universal hook which has readily removable and renewable wear parts. Other objects of the invention are mentioned and described herein.

The preferred embodiment of my invention is illustrated in the accompanying drawing, wherein—

Similar numerals of reference indicate like parts throughout the several views on the drawing.

Figure 1:
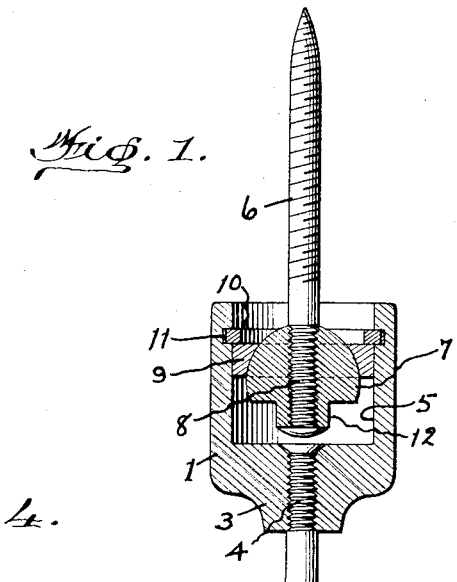
Figure 1 represents an elevational and partially sectional view of the assembled device.
Figure 4:
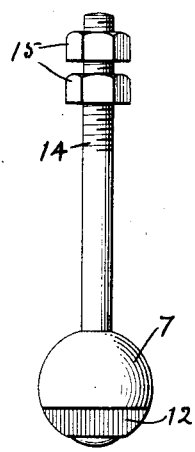
Fig. 4 represents a modified form of the supporting element.
Figure 2:
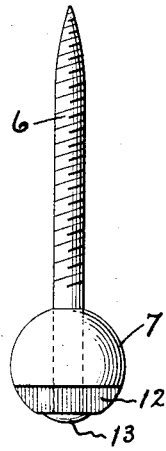
Fig. 2 represents an elevational view of the supporting screw and its bearing head.
Figure 3:
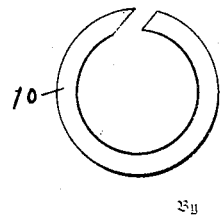
Fig. 3 represents a view of the split abutment ring.

Referring to the details of the drawing the numeral 1 indicates a clyindrical cup-like socket element having the carrier hook 2 rigidly connected with the lower end wall 3 thereof at 4 in any suitable manner.

As illustrated, the hook shank is screw threaded into the end wall 3 of the socket element and has its upper end riveted or beaded over to securely fasten it therein. The socket element 1 is provided with a cylindrical bore or chamber 5 which is open at its upper end and adapted to contain a lubricant and the assembly of the bearing elements hereinafter described.

The preferred structure of my invention contemplates a carrier or supporting screw 6 adapted to be screwed into a wood frame of a porch swing, or other wood structure—not shown—and a spherical bearing head or ball 7 rigidly mounted upon the lower end of said screw by threads 8, or otherwise, said bearing head being arranged within the chamber 5 and being in universal engagement with the under surface of the annular bearing ring 9. The ring 9 is removably fitted in the chamber 5 and bears against an abutment ring 10, the latter being a transversely split spring ring to enable its ready application or removal from the annular groove 11 in which it is normally mounted and which is formed in the wall of the bore 5 adjacent the top end thereof. The lower end of the screw 6 may be riveted or beaded over at 13 and the head 7 may be formed with the transverse ridge 12 formed thereon to receive a suitable tool or wrench to enable the application of the bearing head 7 to the threads 8.

When my improved universal hook is used for supporting porch swings, or the like, and the chamber 5 filled with suitable lubricant, it is a noiseless article and free from disagreeable sounds due to the friction resulting from movement of the swing when the latter is heavily loaded.

I claim:

1. A device of the character described comprising a socket element provided with a cup-like cylindrical lubricant chamber, a hook rigidly connected with the lower end of said socket element, a screw element provided with a bearing head, the latter being arranged within said lubricant chamber and in engagement with and adapted for universal movement upon a bearing ring removably mounted within said chamber, and removable abutment means for said bearing ring.

2. A device of the character described comprising a socket element provided with a cup-like cylindrical lubricant chamber, a hook rigidly connected with the lower end of said socket element, a ring-like bearing element removably mounted within said lubricant chamber, a screw element provided with a hemi-spherical bearing head, the latter being in engagement with said bearing ring and adapted for universal movement thereon, and a split spring abutment ring to maintain the juxtaposition of said bearing ring.

3. A device of the character described comprising a socket element provided with a lubricant chamber open at its upper end, a bearing ring mounted within said chamber, a screw element provided with a separate element bearing head, the latter being in engagement with said bearing ring and adapted for universal movement thereon, and a hook connected with the lower end of said socket element.

4. A device of the character described comprising a socket element provided with a cylindrical lubricant chamber open at its upper end, a bearing ring mounted within said chamber, a screw element provided with a separate element bearing head which is in engagement with said bearing ring and adapted for universal movement thereon, said bearing head being provided with a transverse ridge adapted to receive a tool, and a hook connected with the lower end of said socket element.

5. In combination, a socket element provided with a cylindrical lubricant chamber open at its upper end, a bearing ring mounted within said chamber, a bolt element provided with a separate element bearing head which is in engagement with said bearing ring and adapted for universal movement thereon, and a hook connected with the lower end of said socket element.

Signed at Elkhart, Indiana, this 14th day of July, 1928.

JACK L. KRIEG.